Oct. 27, 1970   F. M. Y. KATEB   3,535,942
SEALING MEMBERS
Filed Oct. 7, 1968

United States Patent Office 3,535,942
Patented Oct. 27, 1970

---

3,535,942
SEALING MEMBERS
Fuad M. Y. Kateb, Mentone, Victoria, Australia, assignor to Girling Limited
Filed Oct. 7, 1968, Ser. No. 765,460
Claims priority, application Great Britain, Oct. 23, 1967, 48,076/67
Int. Cl. F16j *15/50*
U.S. Cl. 74—18.2                                    3 Claims

ABSTRACT OF THE DISCLOSURE

An hydraulically operated disc brake system, including an hydraulic operating cylinder open at its front end and a piston working in the cylinder and projecting from the front end thereof, is provided with an elastically flexible sealing boot of improved form, the boot comprising as integral parts thereof inner and outer sleeve portions, for elastically engaging around sealing surfaces provided on the piston and cylinder respectively, and a web portion interconnecting the sleeve portions, the outer sleeve portion when in unstretched condition being of greater diameter at its front end, where it is attached to the web, than at its free rear end.

---

This invention relates to flexible sealing boots used in the cylinder and piston assemblies of hydraulically operated disc brake systems for sealing the front end of the piston to the open front end of the cylinder in which the piston is movable.

In known arrangements, the piston and cylinder are each recessed at their outer ends to present an external cylindrical sealing surface; a sealing boot of rubber or rubber-like material is formed with inner and outer cylindrical sleeve portions connected by a flexible web, and the said sleeve portions are slightly stretched around the respective cylindrical surfaces to form a seal thereagainst, the flexibility of the web permitting displacement of the piston relative to the cylinder in use. To prevent the outer sleeve portion from becoming dislodged in operation, a split, spring steel ring is usually fitted over it. However, the use of such a split ring tends to pucker the outer sleeve portion in the region of the split, and thus provide access for the ingress of contaminents, which may in time corrode the working surfaces of the piston and cylinder.

In accordance with the present invention, the sealing efficiency of a flexible boot of the above general character is improved by so forming the outer sleeve portion that when in unstretched condition it is of greater diameter at its front end, where it is attached to the web portion, than at its free rear end.

With such a construction it can be ensured that the free rear end part of the outer sleeve portion is sufficiently stressed circumferentially to make secure engagement with the cylinder, without substantially tensioning radially the flexible web, which would otherwise interfere with free movement of the piston.

Preferably, the outer sleeve portion is provided on its inner surface with an annular rib or projection which, on assembly produces a further, localised stressing of the said portion.

Particular forms of the invention will now be described, by way of example only, with reference to the accompanying drawing, in which.

Figure 4:
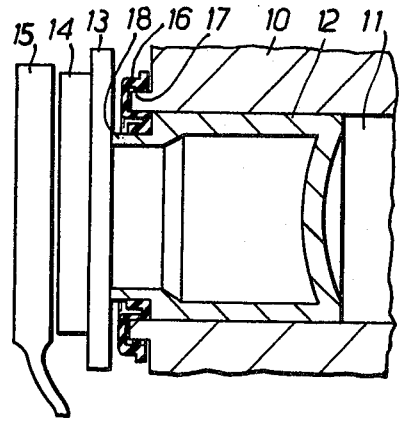
FIG. 4 is a part sectional view of parts of an hydraulically operated disc brake system, including a piston and cylinder assembly provided with a sealing boot of the form shown in FIG. 1.

Referring first to FIG. 4, the brake system illustrated includes a calliper assembly, part of which is indicated at 10, provided with an hydraulic operating cylinder 11. A piston 12 works in the cylinder and projects from the open front (left-hand) end of the cylinder, the front end of the piston engaging a plate 13 which carries a brake pad 14. Hydraulic pressure within the cylinder operates to move the piston forwardly, forcing the brake pad 14 into engagement with the brake disc 15. The cylinder and piston are recessed at their forward ends to provide outwardly directed cylindrical surfaces 17 and 18, respectively, which are embraced by an elastically flexible sealing boot 16.

Figure 1:
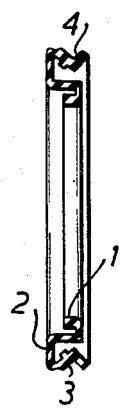
FIG. 1 is a cross section of one form of sealing boot in accordance with the invention.
Figure 2:
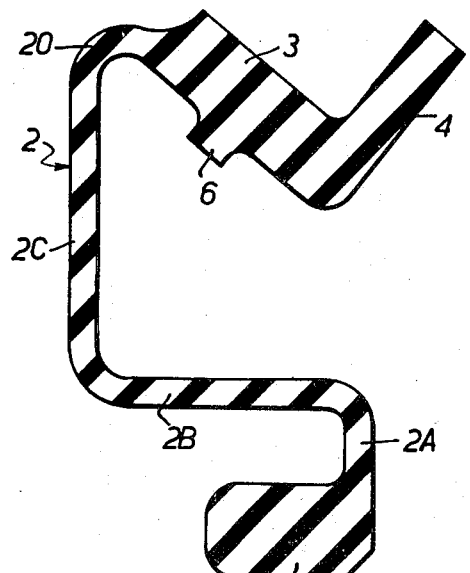
FIG. 2 is an enlarged cross-sectional view of the boot of FIG. 1.

The sealing boot 16 of FIG. 4 is shown separately in FIGS. 1 and 2 in its unstressed, as-moulded form. The boot, which is an integral one-piece moulding of rubber or rubber-like material, comprises an inner cylindrical sleeve portion 1, connected at its rear end by a flexible web 2 to the front end of an outer sleeve portion 3 of generally frusto-conical cross section, tapering towards its free, rear end, at which there is a peripheral flange 4. The inner and outer portions 1 and 3 are considerably thicker than the web 2, and the portion 3 has a local thickening in the form of an annular rib or projection 6 on the inner, sealing surface of the portion 3.

It will readily be appreciated that when the outer portion 3 is fitted over the cylindrical sealing surface of the cylinder, the free rear end will be stretched considerably more than the front end, connected to the web 2, so that the circumferential stresses in the outer portion will be much higher at the free end than at the other.

In the form of sealing boot shown in FIGS. 1 and 2, the web 2 has an inner radially extending portion 2A, connected by an intermediate cylindrical web portion 2B to an outer radial web portion 2C, which is in turn connected by a curved heel portion 2D to the outer sleeve portion 3. On assembly, the heel portion 2D is slightly stressed, and thereby exerts a moment tending to hold the adjacent part of the portion 3 against the adjacent sealing surface of the cylinder, but this stressing of the heel portion does not induce undesirable tensioning of the web portion 2C.

Figure 3:
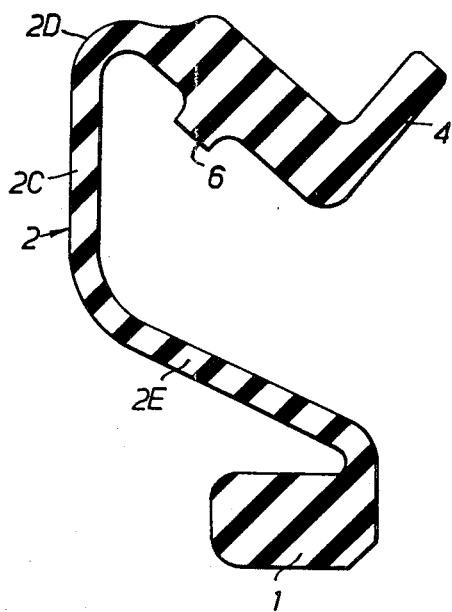
FIG. 3 is a view corresponding to FIG. 2 of another form of boot in accordance with the invention.

In the modified form of sealing boot illustrated in FIG. 3 the radially and axially extending portions 2A and 2B of the web are replaced by an inclined web portion 2E. The construction and mode of operation are otherwise identical with that of FIGS. 1 and 2.

I claim:

1. In an hydraulically operated disc brake system including an hydraulic operating cylinder having an open front end and provided adjacent said front end with an outwardly facing cylindrical sealing surface, and a piston working in the cylinder and having a front end which projects from the front end of the cylinder and is shaped to provide an outwardly facing cylindrical sealing surface, an elastically flexible sealing boot, integrally moulded from elastomeric material and comprising as integral parts thereof: an inner sleeve portion which is elastically stretched around said sealing surface of the piston; an outer sleeve portion, surrounding and spaced outwardly from said inner sleeve portion, which is elastically stretched around said sealing surface of the cylinder; and a flexible annular web portion connecting said inner sleeve portion to one end of said outer sleeve portion; said outer sleeve portion when in unstretched as-moulded condition being of generally frusto-conical cross section and tapering from said one end toward the opposite free end thereof whereby said sleeve has a greater diameter at said one end than at its opposite free end so that when the latter is stretched over said sealing surface of the cylinder said one end thereof is less highly stressed circumferentially than is said opposite free end thereof due to the smaller diameter of the latter with respect to the former.

2. A sealing boot as defined in claim 1 and comprising as a further integral part thereof an annular rib projecting inwardly from the inner surface of the outer sleeve portion.

3. A sealing boot as defined in claim 1 and comprising as a further integral part thereof an annular flange projecting outwardly from said opposite free end of the outer sleeve portion.

References Cited

UNITED STATES PATENTS

| | | | |
|---|---|---|---|
| 2,509,643 | 5/1950 | House | 74—18.2 XR |
| 2,768,710 | 10/1956 | Butler | 188—152.873 XR |
| 2,861,655 | 11/1958 | Butler | 188—152.873 XR |
| 3,432,010 | 3/1969 | Hemus | 74—18.2 XR |

FRED C. MATTERN, Jr., Primary Examiner

F. D. SHOEMAKER, Assistant Examiner

U.S. Cl. X.R.

188—100, 152